United States Patent Office.

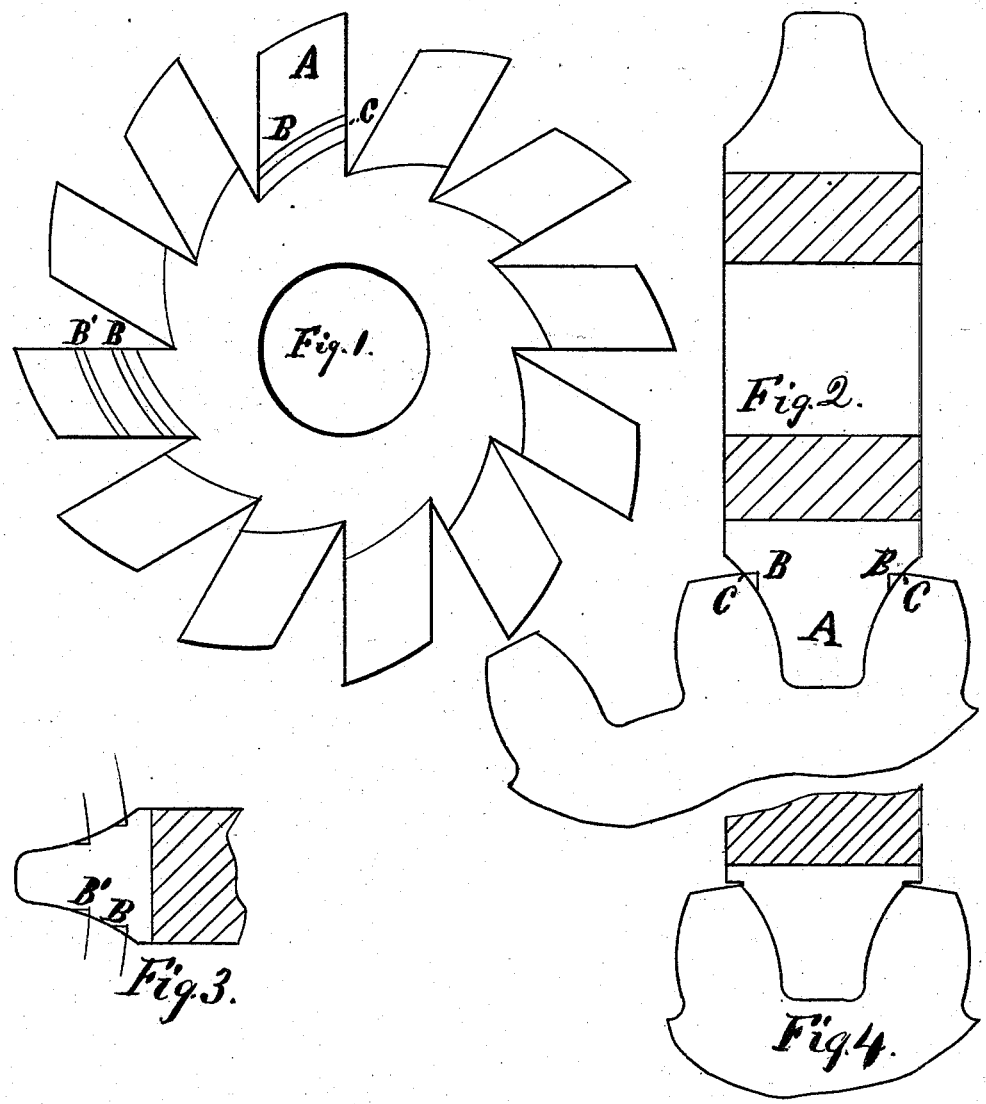

OSCAR J. BEALE, OF PROVIDENCE, RHODE ISLAND, ASSIGNOR TO BROWN & SHARPE MANUFACTURING COMPANY, OF SAME PLACE.

GEAR-WHEEL CUTTER.

SPECIFICATION forming part of Letters Patent No. 237,234, dated February 1, 1881.

Application filed May 17, 1880. (No model.)

*To all whom it may concern:*

Be it known that I, OSCAR J. BEALE, of Providence, in the county of Providence and State of Rhode Island, have invented a new and useful Improvement in Gear-Wheel Cutters, of which the following is a specification, reference being had to the accompanying drawings.

The object of my invention is to make a gear-wheel cutter in one piece, complete within itself, with all the devices necessary for cutting and measuring the spaces between the teeth of gear-wheels, without the aid of the special tools or systems of figuring and measuring which have hitherto accompanied and of necessity been connected with the use of these cutters.

My invention relates to that class of gear-cutters in which the teeth are in segmental shape and their peripheries eccentric with the axis of the cutter, the latter form giving clearance to the backs of the teeth; and the invention consists in making a gage of one tooth of the cutter for gaging the spaces between the teeth of the gear-wheels which are to be made by the cutter, whereby an accurate and unchanging gage is made with the cutter in one piece, which performs the functions of all the devices heretofore used for obtaining the size of the spaces.

The great advantage of having the gage a part of the cutter itself is obvious: First, being a part of the cutter, it will not materially increase its cost, while the gage used with each size of the best gear-cutters at the present time costs as much as a good pocket-rule; secondly, it is well known to artisans that the more tools there are used in a mechanical operation the greater chance there is for errors; thirdly, the gage is liable to be mislaid, lost, or broken, and, unless there be a duplicate kept on hand (at still greater expense) for such contingencies, much inconvenience, if not damage, might occur before another gage could be obtained.

Either a gage must be made in the cutter itself, or a separate device must be furnished with the cutter for determining the size of the spaces it is to cut. The spaces between the teeth of gear-wheels cannot be measured by a common rule—an expert in the art cannot cut a gear-wheel without a gage.

With one tooth made into a gage the cutter is complete. Without it it is not a completed article, not being capable of performing its proper function without the aid of other devices, and it is essentially defective, and subjects those who purchase and use them to unnecessary expense and inconvenience.

In the accompanying drawings, Figure 1 represents a side elevation of a gear-wheel cutter embracing my improvement; Fig. 2, a central transverse section of a cutter and an end view of teeth and spaces of a gear-wheel. Fig. 3 represents the face of a double gage-tooth for gaging the spaces in bevel-gears. Fig. 4 represents a gage-tooth made with shoulders at the base and outside of the tooth.

The tooth A represents the gage in my improved cutter for gaging the depth of the spaces between the gear-wheel teeth which are to be made by the cutter.

The gage is constructed by making a groove, B, in one or both sides of the tooth, as shown in Figs. 1 and 2. The groove is made parallel with the peripherical contour of the tooth. The shoulder C of the groove B, the face of which may be parallel with the axis of the cutter, constitutes the gage, and is the point to be governed by in using the cutter, as shown in Fig. 2.

Instead of making the shoulder within the limits of the tooth, as represented in Figs. 1 and 2, it may be made outside of it, as represented in Fig. 4, except groove B′, Fig. 3, which must be within the limits of the tooth.

I prefer to make the groove B in the shape represented in the drawings; but it may be made in any other form desired, and may be made in one or more teeth in each cutter.

The gage made with one groove, as above described, is for gaging the spaces in spur-gear wheels.

Fig. 3 represents a cutter-tooth having an additional groove, B′, which shows the least depth of the spaces in bevel-gear wheels, groove B, same figure, being the same as the spur-gear-wheel gage, and which also shows the greatest depth of the spaces in bevel-gear. The grooves in the teeth forming the gage are made with the mechanism by which the backs of the teeth are made eccentric with the axis of the cutter.

The cutter being once adjusted to cut the spaces of the right depth, all of the spaces in that wheel, and others of the same pitch and size, can be cut without further adjusting it, as its position is not changed to affect the depth of the spaces. When using a gage made within the limits of the tooth represented in Figs. 1 and 2, it will generally be found necessary to stop the machine once or more in setting the cutter by the gage, as the gage-groove cannot be distinctly seen when the cutter is in motion. The cutter can be set very nearly right before it is put in motion by turning the cutter so that the cutting-face of the gage-tooth will be perpendicular to the face of the blank wheel and sighting over the face of the wheel. Probably it can be set in that way within .0005 of an inch. A common try-square can also be used to good advantage to set the cutter by, as the corner of the square tongue, when properly applied, will come exactly to the gage when the cutter is in the right position; but the shoulder of the gage-groove should be outside of the tooth, as represented in Fig. 4, for all regular spur-gear work. To cut gears for rolling-machines, the gage must be within the limits of the tooth; but such gears are not often cut. It will not be found necessary to stop the machine to adjust the cutter when the shoulder of the gage-mark is outside of the tooth, Fig. 4. The workman can easily see when the shoulder comes in contact with the face of the blank while the cutter is in motion. He can see between the gage-shoulder and the blank when they do not touch, and when they do touch the blank will instantly show it.

The setting of the cutters by this gage, whether made within the limits of the tooth or outside of it, is very easily accomplished by any ordinary machinist.

Having fully explained my invention, what I claim as new, and desire to secure by Letters Patent, is—

As an improvement in cutters for cutting the teeth of metal gear-wheels, grooves or shoulders on the side or sides of one or more of the teeth, parallel to the peripherical contour of the tooth, to indicate the depth attained by the cutter, substantially as described.

OSCAR J. BEALE.

Witnesses:
GEO. W. BROWN,
GEO. B. BEALE.